Nov. 7, 1967 G. A. KELLEY 3,350,892
TWO-STAGE AIR CONDITIONING SYSTEM
Filed April 4, 1966
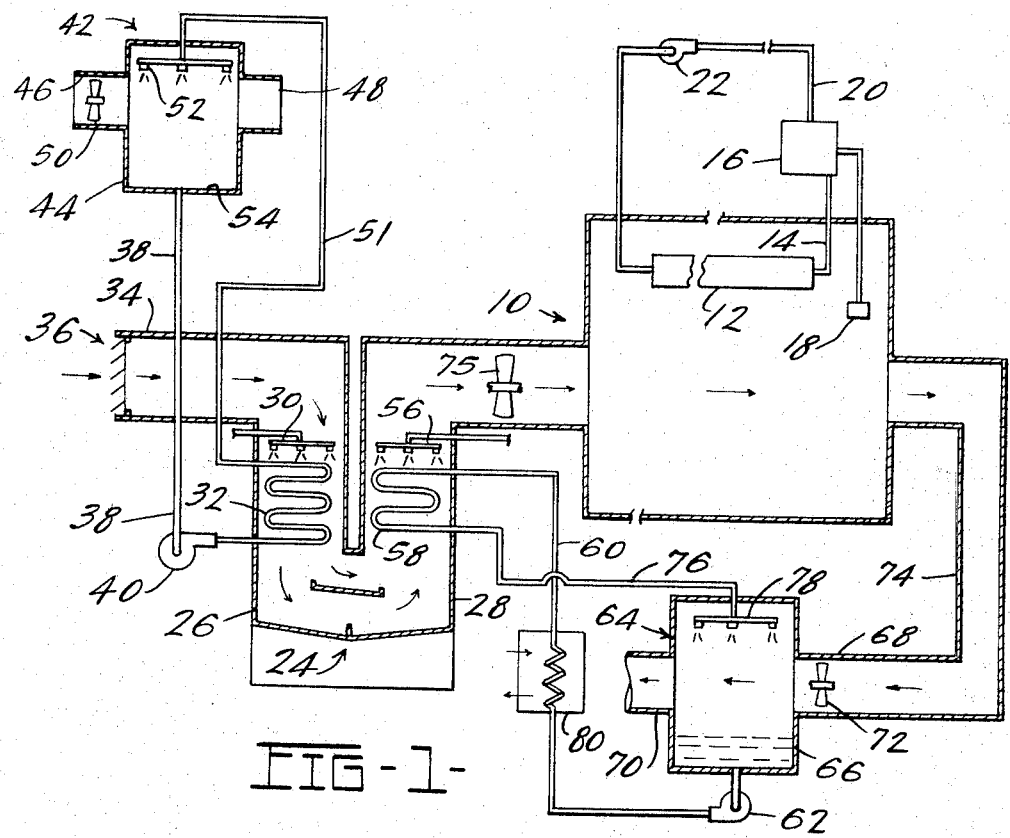
FIG-1-
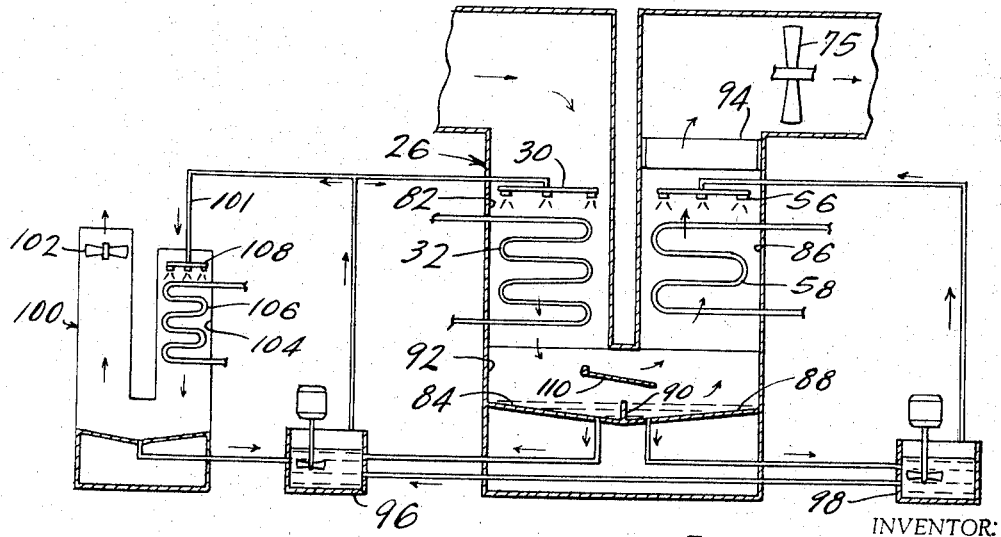
FIG-2-
INVENTOR:
GILBERT A. KELLEY.
BY
ATT'YS.

United States Patent Office 3,350,892
Patented Nov. 7, 1967

3,350,892
TWO-STAGE AIR CONDITIONING SYSTEM
Gilbert A. Kelley, Toledo, Ohio, assignor to Midland-Ross Corporation, Toledo, Ohio, a corporation of Ohio
Filed Apr. 4, 1966, Ser. No. 539,869
12 Claims. (Cl. 62—94)

ABSTRACT OF THE DISCLOSURE

In this invention, a method of, and means for, supplying conditioned air to a space is provided. The air to be conditioned is sequentially passed over a pair of cooling coils. The first cooling coil has cooled water therein that has been reduced in temperature by passing the same through a flow of atmospheric air. The second cooling coil has water flowing therethrough that has been cooled by passing it through air exhausted from the air conditioned space. Individual streams of hygroscopic solution are passed over the cooling coils and a portion of the first stream is diverted into the sump under the second coil. The first combination of coil and hygroscopic spray reduces the humidity of the air and the second combination reduces the temperature of the air and also dehumidifies to some extent. The diversion of the hygroscopic solution from the first coil to the sump of the second coil provides a convenient and simple method of controlling the concentration of hygroscopic solution that passes over the second coil.

---

This invention relates to the conditioning of air and particularly to the dehumidifying and cooling of air for a space which is cooled primarily by water-cooled panels.

In recent years, a number of systems have been devised for cooling spaces by means of water-cooled panels, particularly open grid panels located near the ceilings of the spaces. It has also been found to be desirable to condition, including dehumidify, air in the same space to provide greater comfort and apparent lower temperatures to the occupants. In addition to comfort, it is important to supply air having a sufficiently low dewpoint to the space for the purpose of preventing condensation on the panels and, consequently, dripping of water into the space. Such a condition can easily occur if the dewpoint of the air in the space is above the temperature of the surfaces of the panels. The conditioning of the air, where heretofore proposed, usually has been accomplished by refrigeration, which is a relatively expensive means for conditioning the air.

The present invention relates to an air conditioning system for a space which is primarily cooled by water-cooled or similar artificially-cooled panels. The system includes means for dehumidifying and cooling the air supplied to the space the desired amount without the use of additional refrigeration. For cooling purposes, the system utilizes outside air to aid in cooling the air to be conditioned, and also uses exhausted air from the space to further cool the air in the second stage, the conditioned air being dehumidified in both stages. With this two-stage system and the use of outside air and exhausted air, refrigeration need not be employed for the supplied air, except possibly as a standby for extreme conditions. The system also enables the required low dry bulb temperatures and dewpoints to be obtained from chemical dehumidification, which could only be obtained heretofore by refrigeration. The system also is capable of utilizing heat from the exhausted air during cool weather operation.

It is, therefore, a principal object of the invention to provide a system for conditioning air for a space without using refrigeration.

Still another object of the invention is to provide a two-stage cooling system for air to be conditioned utilizing outside air and exhaust air from the conditioned space.

Other objects and advantages of the invention will be apparent from the following detailed description of a preferred embodiment thereof, reference being made to the accompanying drawing, in which:

FIG. 1 is a diagrammatic view of an overall air conditioning system embodying the invention; and FIG. 2 is an enlarged, schematic view of a two-stage dehumidifying unit employed with the system of FIG. 1.

Referring particularly to FIG. 1, a space being cooled is indicated at 10 with the cooling effected by a ceiling panel 12 to which cooled water is supplied through a line 14 from a cooling unit 16 which is usually in the form of a refrigeration unit. The operation of the unit 16 is controlled by a thermostat 18 located in the space 10 with water supplied to the unit 16 by a return line 20 in which a circulating pump 22 is located. By way of illustration and example, the temperature in the space 10 can be maintained at 74° F. dry bulb and 61° F. wet bulb. Under these conditions, the air supplied to the space must contain not more than 35–39 grains per pound of dry air, with a dewpoint of 39°–42° F., to prevent condensation on the panel 12, and consequently, water dripping into the space 10.

In accordance with the invention, the required air with the low dewpoint and moisture content is obtained for the space 10 without any relatively-expensive refrigeration cooling being required. Preferably, the desired conditions are achieved in a two-stage dehumidifying and cooling unit 24 although the conditions can also be obtained by the use of two separate units. The single two-stage unit, however, and particularly one embodying the principles of the unit 24 has a number of advantages over separate units. The unit 24 includes a first stage 26 in which air supplied to the space 10 is dehumidified and a second stage 28 in which the air is cooled and also further dehumidified to some extent. By way of example, assume that it is desired to supply aid at approximately 35 grains per pound, as discussed above, and that air is brought into the system under design conditions of 86° F. dry bulb and 140 grains. This air exits from the first stage 26 at 100° F. dry bulb and 50 grains of moisture. In the second stage 28, the air is cooled to 85° F. dry bulb and further dehumidified to 35 grains. This air is conditioned without any refrigeration cooling at all.

The structural details of the two-stage unit 24 will be discussed more fully subsequently. From an operation standpoint, in the first stage 26, a hygroscopic liquid is supplied through sprays 30 over a cooling coil 32 and into intimate contact with outside air supplied through a duct 34 from an intake louver 36. Coolant, such as water, is supplied to the coil 32 from a supply line 38 in which is a suitable pump 40, the water being supplied from an outdoor cooling tower 42. The cooling tower 42 is of a conventional design and includes a housing 44 through which air is supplied from an inlet 46 to an outlet 48 by a blower 50. The water is supplied to the tower 42 through a line 51 and sprayed through the air stream from sprays 52. The cooled water is then collected in a sump 54 and returned through the line 38 to the coil 32. To achieve the aforementioned conditions with an air supply of 22,500 c.f.m., water is supplied at a rate of 415 g.p.m., with the temperature of the water from the coil 32 being 97° F. and returned through the line 38 to the coil 32 at 85° F. The cooling effect of the water under these conditions, however, does not balance the heating effect of the hygroscopic liquid, with the result that the temperature of the air is raised 14°, from 86° to 100°, although its humidity content is reduced by 90 grains, from 140 to 50 grains.

In accordance with the invention, the cooling effect in the second stage 28 is achieved by use of the exhaust air from the space 10. Under the above conditions, the air is exhausted from the space 10 at a rate of 16,000 c.f.m. and at a temperature of 63° wet bulb. In the second stage 28, hygroscopic liquid is supplied to sprays 56 and sprayed over a second cooling coil 58. Coolant such as water is supplied to the coil 58 from a supply line 60 in which is a suitable pump 62. The water is supplied from an exhaust air cooling tower 64 which includes a housing 66, an inlet 68, an outlet 70, and a blower 72. The inlet 68 is connected by an exhaust duct 74 with the space 10, with the blower 72 and the duct 74 assuring that a proper quantity of air is exhausted from the space 10. A fan 75 in the unit 24 assures the proper flow of outside dehumidified air to the space. The water is supplied across the air stream from a line 76, connected to the coil 58, and sprays 78. The water under the example noted is supplied to the line 76 at 82° F. and is returned to the coil 58 at 74° F., and at a rate of 184 g.p.m. This enables the air supplied to the space 10 to be cooled 15° in the second stage 28 and at the same time the moisture content reduced by 15 grains.

From the above, it will be seen that the desired conditioned air is supplied to the space 10 without the need for any refrigeration. This is accomplished by the combination of the outdoor cooling tower 42 and the exhaust air cooling tower 64 which utilizes conditioned air to the maximum and eliminates the need for refrigeration. This saves both capital and operating costs. In the specific example discussed herein, the operating cost savings can amount to over $80 per 1,000 c.f.m. of air per year. Many large buildings employ 50,000 to 100,00 c.f.m. of outside air. Consequently, the savings can be markedly significant. If desired, a standby chiller 80, utilizing 45° chilled water, can be employed as a safety margin if the outside air conditions exceed those for which the system was designed, but this is by no means essential.

The system of FIG. 1 also can be effectively employed in the winter when humidification is desired. Under winter conditions, by way of example, air at a rate of 22,500 c.f.m. is supplied to the two-stage conditioning unit 24 at 47° F. dry bulb and 5 grains. No work at all is done in the first stage 26 but in the second stage 28, the air is humidified by employing a diluted hygroscopic solution, with the air then supplied to the space 10 at 47° F. dry bulb and 20 grains. Under these conditions, the water from the coil 58 for the second stage 28 is sprayed, in the cooling tower 64, through air exhausted from the space at a rate of 14,000 c.f.m. and at 57° wet bulb. The water enters the cooling tower 64 at 50.5° F. dry bulb and is circulated back to the coil 58 at 53° F. dry bulb, at a rate of 184 g.p.m. Consequently, under winter conditions, again the exhaust air from the space is used to contribute to the desired conditioned effect, in this instance transferring heat to the incoming air.

The two-stage conditioning unit 24 of the invention is shown in more detail in FIG. 2. The first stage 26 includes an upper passage 82 in which the coil 32 is located with a first sump 84 directly below the coil 32. The second stage 28 includes a second passage 86 for the coil 58 with a second sump 88 located below the coil 58 and separated from the first sump by a partition 90. The passages 82 and 86 are connected by a common lower passage or chamber 92. This arrangement of the various passages minimizes the amount of materials and fabrication required for the combined two-stage unit and also minimizes the duct work required. Floor space for the unit is also held to a minimum. Further, with the two-stage unit, only one eliminator 94 is needed to remove any hygroscopic liquid entrained in the air and the single eliminator both reduces the cost of such and reduces the pressure drop resulting when the air passes therethrough.

A first pump 96 removes hygroscopic liquid from the first sump 84 and returns it to the sprays 30. A second pump 98 similarly removes hygroscopic liquid from the sump 88 and returns it to the sprays 56. Some of the liquid from the second stage also is supplied indirectly through the first stage to a regenerator 100 through a line 101. Under winter conditions when humidification is required a source of water make-up such as a water line 110 having a valve 112 is provided to the first pump 96 to replace water that has evaporated into the air.

The regenerator 100 is used in the usual manner to drive off water from and regenerate the hygroscopic liquid used with the conditioning unit 24. The regenerator 100 includes a blower 102 for supplying scavenger air, usually outside air, through a passage 104 containing a steam-heated coil 106. Hygroscopic liquid from the pump 96 is supplied to sprays 108 and over the coil 106 where moisture is evaporated and carried away by scavenger air. The regenerated liquid is then returned to the first stage pump 96 and re-supplied to the first stage 26 of the unit 24.

The hygroscopic liquid in the second stage 28 of the unit is less concentrated and cooler than that in the first stage 26, adding less heat to the air and removing less moisture than in the first stage. In order to reduce the controls required for the two-stage unit 24 and increase the resulting savings, a slanted trough 110 is located above the partition 90 and slopes toward the sump 88, as shown. The trough 110 collects a portion of the hygroscopic liquid dripping from the first coil 32 and received from the sprays 30 and enables this liquid to flow above the partition 90 and into the sump 88. The trough 110 need not be adjusted in any manner but the concentration of the hygroscopic solution of the overall unit can be varied in the event that the moisture content of the air supplied to the space 10 is to be changed. This can be accomplished, for example, by a suitable control (not shown) which senses the moisture content of the exiting air and controls the steam through the coil 106 thereby to regulate the concentration of the hygroscopic liquid. The trough 110 is effective to transfer a predetermined amount of dilute hygroscopic liquid to the sump 88, such as approximately $\frac{1}{10}$ g.p.m. for the example discussed previously. The trough also is practical in that it cannot easily be plugged or blocked. Further, the trough is simple and low in cost.

I claim:

1. A method of conditioning air for a space which is to be cooled by artificially-cooled surfaces therein, said method comprising cooling water outside the space by spraying the water through outside air, passing the water through a first coil, spraying hygroscopic liquid over said coil, directing air to be conditioned past said coil, collecting the hygroscopic liquid in a first sump below the coil, exhausting air from the space, cooling additional water by spraying the additional water through the exhausted air, passing the additional water through a second coil, spraying hygroscopic liquid over said second coil, directing the air to be conditioned past the second coil after passing said first coil, collecting the hygroscopic liquid from the second coil in a second sump, collecting some of the hygroscopic liquid from the first coil and supplying it to said second sump, regenerating the hygroscopic liquid, and directing the air to be conditioned to the space after passing said second coil.

2. A method of conditioning air for a space to be cooled, said method comprising cooling a heat transfer liquid outside the space by contacting the liquid with outside air, passing the liquid through a first coil, supplying hygroscopic liquid over said coil, directing air to be conditioned past said coil, exhausting air from the space, cooling additional heat transfer liquid by contacting the additional liquid with the exhausted air, passing the additional liquid through a second coil, supplying additional hygroscopic liquid over said second coil, directing the air being conditioned past the second coil after passing said first coil, and directing the conditioned air to the space after passing said second coil.

3. A method according to claim 2 characterized by spraying the liquid through the outside air to effect contact therebetween and by spraying the additional liquid through the exhausted air to effect contact therebetween.

4. A method of conditioning air for a space, said method comprising placing a heat transfer liquid in heat exchange relation with outside air, subsequently placing the liquid in heat exchange relation with air to be conditioned while contacting the air with hygroscopic liquid, exhausting air from the space, placing additional heat transfer liquid in heat exchange relation with the exhausted air, placing the additional liquid in heat exchange relation with the air being conditioned while contacting the air with additional hygroscopic liquid, and directing the now conditioned air to the space.

5. A method according to claim 4 characterized by cooling said heat transfer liquid when placing it in heat exchange relation with the outside air, cooling said additional heat transfer liquid when placing it in heat exchange relation with the exhausted air.

6. Apparatus for conditioning air for a space which is cooled by water-cooled surfaces therein, said apparatus comprising first means for spraying water through outside air for cooling thereby, a first coil, means supplying the cooled water through said first coil, means for spraying hygroscopic liquid over said first coil, means for directing air to be conditioned by said first coil, means for exhausting air from said space, second spray means for spraying additional water through the exhausted air to cool the additional water by the exhausted air, a second coil, means for supplying the cooled, additional water through said second coil, means for spraying hygroscopic liquid over said second coil, means for directing the air to be conditioned by said second coil after passing said first coil, a first sump for collecting hygroscopic liquid from said first coil, a second sump for collecting hygroscopic liquid from said second coil, means for collecting some of the hygroscopic liquid from said first coil and supplying it to said second sump, regenerator means for removing water from the hygroscopic liquid by heating the liquid, and means for directing the now conditioned air to the space after passing said first and second coils.

7. Apparatus for conditioning air for a space which is cooled by water-cooled surfaces therein, said apparatus comprising first means for supplying heat transfer liquid in heat exchange relation with outside air to be cooled thereby, a first coil, means directing the cooled liquid through said first coil, means for supplying hygroscopic liquid over said first coil, means for directing air to be conditioned over said first coil, means for exhausting air from said space, means for supplying additional heat transfer fluid in heat exchange relation with the exhausted air to be cooled thereby, a second coil, means for supplying the cooled, additional liquid through said second coil, means for supplying hygroscopic liquid over said second coil, means for directing the air to be conditioned past said second coil after passing said first coil, and means for directing the now conditioned air to the space after passing said first and second coils.

8. Apparatus according to claim 7 characterized by the first supplying means for the hygroscopic liquid includes spray means for spraying the liquid over said first coil, and the second supplying means for the additional hygroscopic liquid includes spray means for spraying the additional hygroscopic liquid through the exhausted air.

9. Apparatus for conditioning air for a space, said apparatus comprising first means for placing a heat transfer fluid in heat exchange relation with outside air, means for directing the fluid in heat transfer relationship with air to be conditioned, means for exhausting air from said space, means for supplying additional heat transfer fluid in heat exchange relation with the exhausted air, means for supplying the additional fluid in heat transfer relationship with the air to be conditioned, means for supplying hygroscopic liquid in contact with the air to be conditioned, while directing the first fluid in heat transfer relationship therewith, and means for supplying the now conditioned air to the space.

10. Apparatus for conditioning air comprising a housing, first and second generally vertical passages in said housing, a first coil in said first passage, means for supplying hygroscopic liquid over said first coil, a first sump below said first passage, an air inlet for said first passage, a second coil in said second passage, means for supplying hygroscopic liquid over said second coil, a second sump located below said second passage, wall means separating said first and second sumps, an air outlet for said second passage, a trough above said sumps having one end in the lower end of said first passage below said first coil and positioned to receive a small portion of hygroscopic liquid from said first coil, a second end of said trough communicating with the liquid in said second sump, said first end of said trough being higher than said second end whereby hygroscopic liquid collected from said first coil in the first end of said trough will flow downwardly along said trough and into said second sump from the second end of said trough.

11. Apparatus according to claim 10 characterized by a regenerator, and pump means for supplying hygroscopic liquid from both of said sumps through said regenerator and back to said first and second supplying means.

12. Apparatus according to claim 10 characterized by said air inlet being at the upper end of said first passage, and said air outlet being at the upper end of said second passage.

References Cited

UNITED STATES PATENTS

| | | | |
|---|---|---|---|
| 2,057,938 | 10/1936 | Crawford | 62—94 |
| 2,162,158 | 6/1939 | Coey | 62—94 |
| 2,257,486 | 9/1941 | Sewell | 62—94 |

WILLIAM J. WYE, *Primary Examiner.*